United States Patent

[11] 3,568,864

| [72] | Inventor | Stanley E. Truesdell<br>Mentor, Ohio |
|---|---|---|
| [21] | Appl. No. | 880,520 |
| [22] | Filed | Dec. 10, 1969 |
| | | Division of Ser. No. 781,331, Dec. 5, 1968 |
| [45] | Patented | Mar. 9, 1971 |
| [73] | Assignee | Avery Products Corporation |

[54] ALIGNING METHOD FOR PACKAGE LABELING
3 Claims, 6 Drawing Figs.

[52] U.S. Cl. ................................................ 214/152, 294/64
[51] Int. Cl. ............................................................ B65g 47/24
[50] Field of Search ............................................. 214/1 (B2), 1 (BS), 1 (BS3), 1 (BS2), 1 (BS4), 1 (R), 6 (FS), 8.5 (D), 152, 1 (B3); 198/20, 32, 33 (R2); 212/129

[56] References Cited
UNITED STATES PATENTS

| 1,139,070 | 5/1915 | Phelps ........................ | 198/20X |
| 1,974,837 | 9/1934 | Shillinger ..................... | 214/1(B3) |
| 3,215,250 | 11/1965 | Schubert ..................... | 198/33 |

Primary Examiner—Robert G. Sheridan
Assistant Examiner—George F. Abraham
Attorney—McNenny, Farrington, Pearne and Gordon ABSTRACT: A method for transferring and orienting packages which are received from a packaging machine in bilateral symmetry with respect to a longitudinal axis of a moving conveyor and which are then delivered to a labeling device. The method includes the steps of picking up each package in one longitudinal row and transferring each such package to a space between its bilaterally symmetrical package and a following package so that the packages are aligned in single file. During such transfer, the package is rotated on a central axis normal to the conveyor so that the packages are uniformly oriented with respect to each other for proper feeding to the labeling device.

INVENTOR
STANLEY E. TRUESDELL
BY
McNENNY, FARRINGTON, PEARNE & GORDON
ATTORNEYS

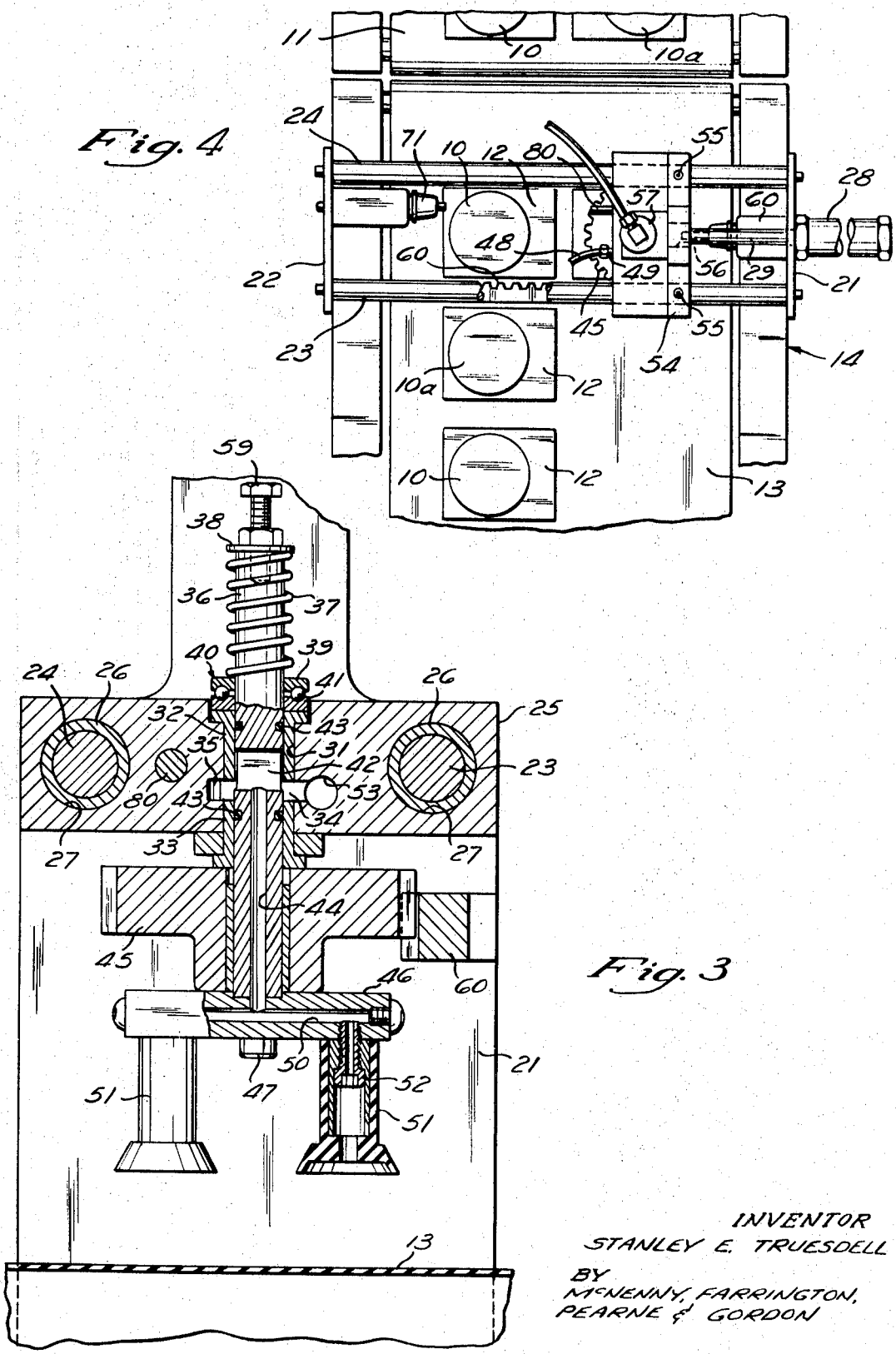

ALIGNING METHOD FOR PACKAGE LABELING

This application is a division of application Ser. No. 781,331 filed Dec. 5, 1968.

BACKGROUND OF THE INVENTION

Machines for packaging articles, such as sliced lunch meat, in semirigid vacuum packages having a flange or header for the application of a label thereto have output ends which deliver the packages from the machine in double file with the orientation of the packages in each file being uniform within the file but the orientation of the packages in one file being angularly removed from the orientation of the workpieces in the other file by a given angular distance. Thus, such packaging machines deliver the packages in double file with the flanges or headers of each group of two packages pointed inwardly toward each other or outwardly away from each other. These packages are then delivered to a labeling machine for the application of a label to each header.

It has been common practice to remove the packages from the packaging machine by hand and to place those packages onto the conveyor belt of the labeling machine so that the packages are uniformly oriented with respect to each other and so that each header is in line with the label applicator. In order to eliminate this handling operation, devices have been proposed which sequentially pick up each package in one longitudinal row and transfer each such package to a space between its bilaterally symmetrical package and a following package in the other row so that the packages are aligned in single file. Such devices swing the package through an arc of 180° to uniformly orient the packages with respect to each other in a single file for proper feeding to the label applicator. Such an arcuate swinging motion, however, is highly undesirable, since the still heat-softened plastic packages may be damaged by the high inertia loads imposed thereon.

SUMMARY OF THE INVENTION

This invention provides a method for properly orienting packages which are fed in bilateral symmetry from a packaging machine so that the packages are similarly oriented in single file to a labeling machine. The method according to this invention includes the steps of picking up each package in one longitudinal row and transferring each package to a space between its bilaterally symmetrical package and a following package so that the packages are aligned in single file. During this transfer, the package is spun on a central axis normal to the package so that the package is not subjected to high inertia loads and so that the packages are all uniformly oriented with respect to each other for proper feeding to the labeling device.

According to this invention, apparatus which may be employed to carry out the method includes a translating carriage having a down-up vacuum pickup head mounted on the translating carriage for oscillatory rotation through an angular distance corresponding to the angular distance required to properly orient the package. Means are provided for translating the carriage between a pickup station and an unloading station and a rack is provided adjacent the path of translation of the carriage for rotating the vacuum head through its angular distance as the vacuum head translates.

BRIEF DESCRIPTION OF THE DRAWINGS

FIG. 3 is a cross-sectional view, the plane of the section being indicated by the line 3-3 in FIG. 2;

FIG. 4 is a plan view of the device which may be employed to carry out this invention;

DETAILED DESCRIPTION OF THE INVENTION

Figure 1:
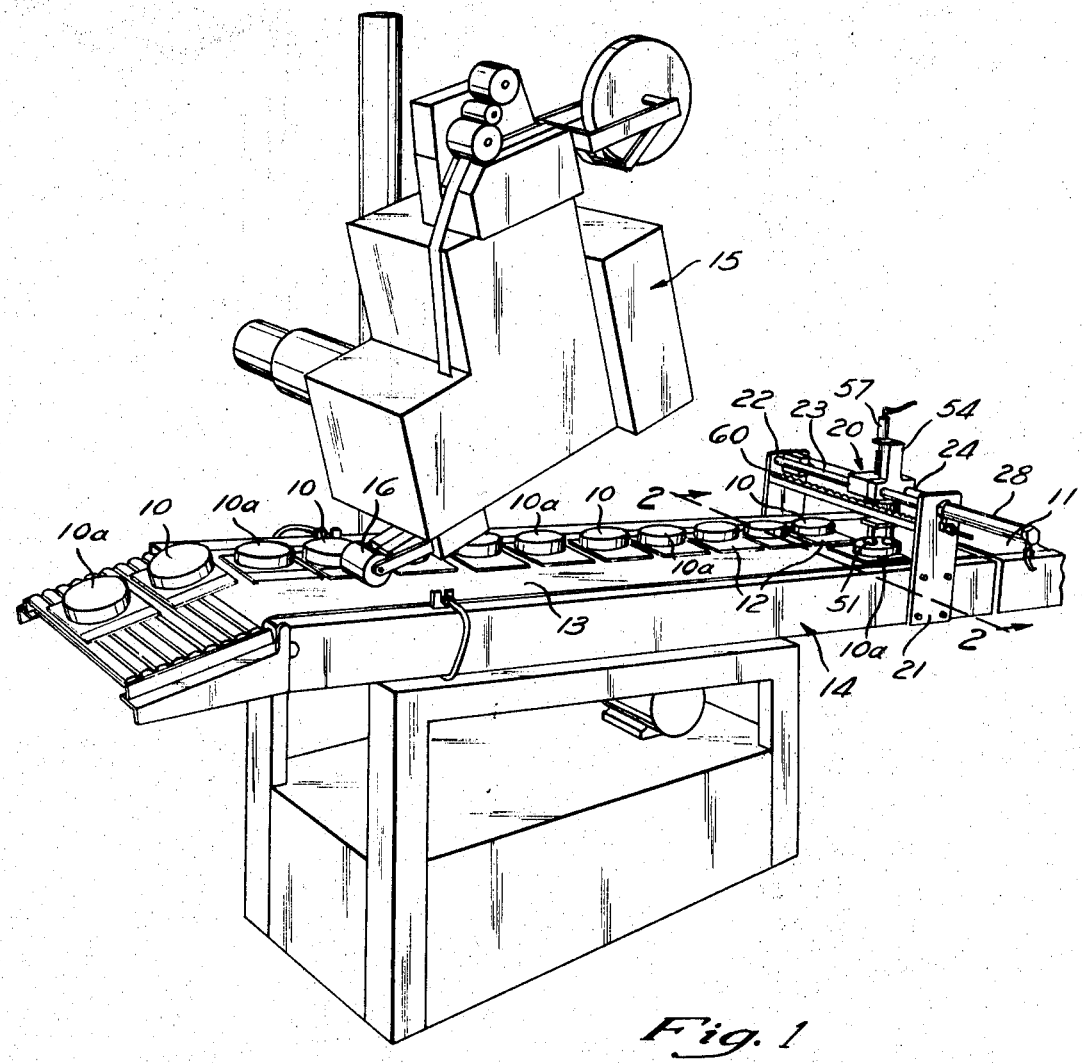
FIG. 1 is a perspective view of apparatus which may be employed to carry out the method according to this invention, showing the apparatus attached to the conveying table of a labeling machine.

As may be seen in FIG 1, flat packages 10 and 10a are delivered by a conveyor belt 11 from a vacuum-packaging and heat-sealing machine (not shown). The packaging machine is designed to deliver such flat packages 10 and 10a in double file, with the package in each file being uniform within the file but the orientation of the package in one file being angularly removed from the orientation of the package in the other file by a given angular distance. In the illustrated embodiment, one package 10a in each file is oriented 180° with respect to the other package 10 in that file so that headers or flanges 12 on each package 10a face a header or flange 12 on the other package 10 in the file.

The packages 10 and 10a are delivered to a conveyor belt 13, which is located on a table section 14 of a label-applying machine 15. The machine 15 includes a roller applicator 16 which applies printed labels to the flange or header 12 of each package 10 and 10a. In order to apply the labels to the headers 12 so that the label is properly positioned on the header 12, each package 10 and 10a must pass beneath the roller 16 in a single row, with each package 10a similarly oriented with respect to each other package 10.

Other packaging machines are designed to deliver packages 10 and 10a in double file, with the headers of each package in each such file directed outwardly with respect to the other package in the file. In such an embodiment and according to this invention, the packages 10a would be similarly oriented with respect to each package 10 and the roller applicator would be positioned to apply labels to the aligned headers 12.

In order to so orient the packages 10a, a vacuum head transfer means 20 is provided. The vacuum head transfer means 20 includes supporting sideplates 21 and 22, which are fixed to the bed 14. A pair of parallel guide rods 23 and 24 extend between and are fixed to the sideplates 21 and 22. A translating carriage 25 is slidably mounted for movement on the rods 23 and 24 and, as may be seen in FIG. 3, the rods 23 and 24 slidably extend through bushings 26, which are press-fitted into parallel bores 27 in the carriage 25.

Figure 2:
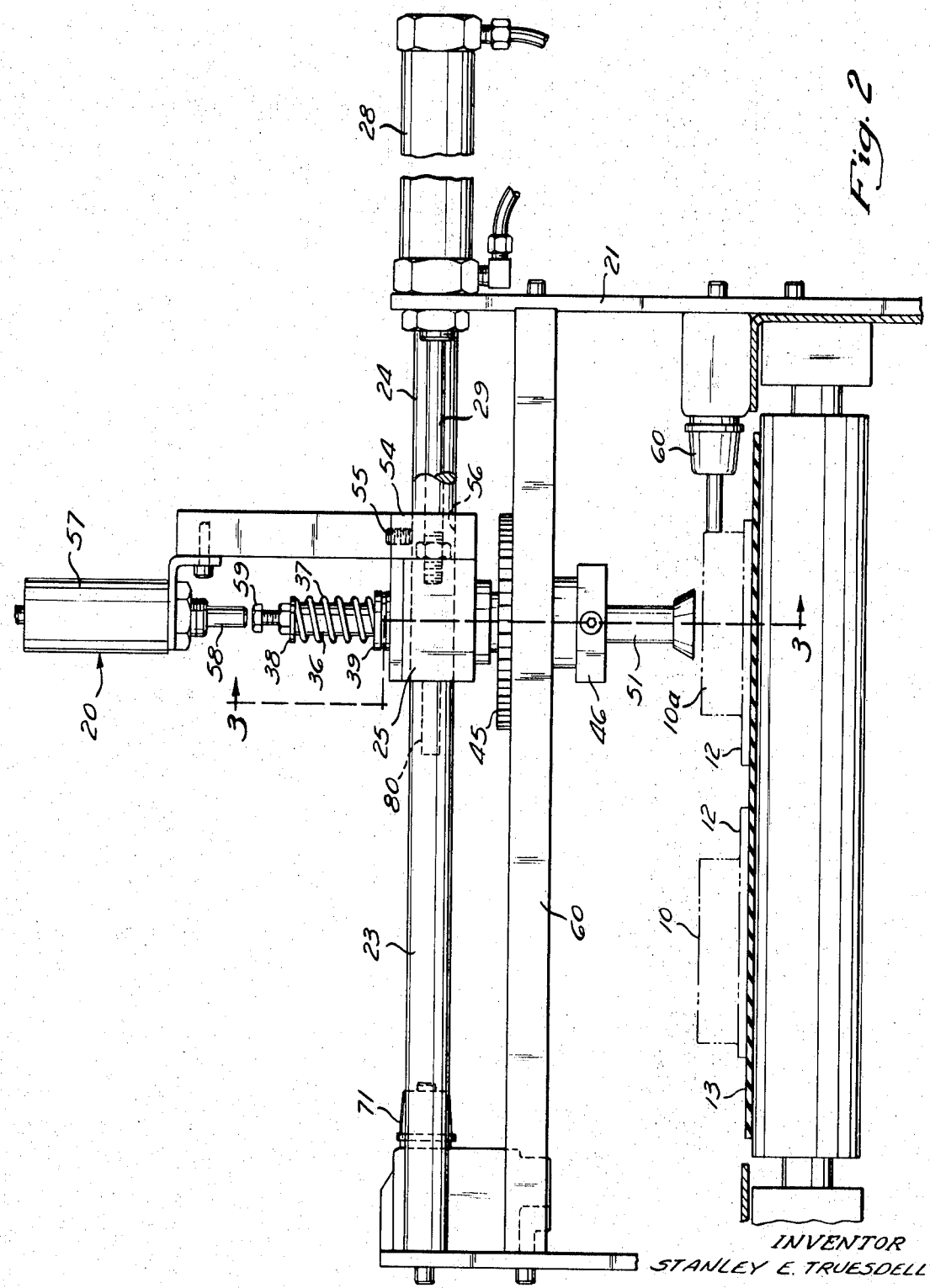
FIG. 2 is a cross-sectional view, the plane of the section being indicated by the line 2-2 in FIG. 1.

Means are provided to translate the carriage 25 to the left, as viewed in FIG. 2, from its illustrated pickup station to an unloading station. To this end, there is provided a double-acting cylinder 28 which is fixed to the sideplate 21 and which has a piston rod 29 extending through an opening (not shown) in the sideplate 21 and fixed to the carriage 25.

As may be seen in FIG. 3, the carriage 25 has a bore 31 within which upper and lower bushings 32 and 33, respectively, are press-fitted. The bushings 32 and 33 have ends which are apaced apart to form an annular opening 34 which communicates with a corresponding annular groove 35 provided in the carriage 25. The bushings 32 and 33 slidably and rotatably receive a spindle 36 which is biased in its illustrated position by a coil spring 37 which extends between a washer 38 and one race 39 of a bearing 40. The other race 41 of the bearing 40 rests on the bushing 32 and is stationary with respect to that bushing. The spindle 36 is provided with a cross slot 42 which communicates with the space 34 between the bushings 32 and 33, and therefore the annular groove 35 in the carriage 25. A pair of O-rings 43 seal the passageway 42 with respect to the bushings 32 and 33. An axial passageway 44 extends from the passageway 42 to the lower end of the spindle 36.

A spur gear 45 is locked to the spindle 36 by a setscrew (not shown) and a manifold 46 is fixed to the spur gear 45 by bolts 47. The manifold 46 has a passage 50 which communicates with the passageway 44. A pair of suction cups 51 are fixed to the manifold 46 by hollow screws 52 so that passageways are provided through the cups 51, the manifold 46, and the spindle 36 to the annular groove 35. The groove 35 communicates with a bore 53 which is drilled into the carriage 25 and which has a flexible conduit 48 fixed thereto by a fitting 49 (FIG. 4).

The shaft 36 is driven downwardly against the bias of the spring 37 by a means for momentarily depressing the vacuum pickup head at the loading station to engage a package 10a. This means includes a block 54 which is adjustably fixed to the guide rods 23 and 24 by setscrews 55. The block 54 is provided with a clearance passage 56 for the piston rod 29 and has a fluid-operated spring return piston 57 fixed to its upper end so that a piston rod 58 of the cylinder 57 is axially aligned with the spindle 36. The effective stroke of the spindle 36 may be adjusted by a screw 59 which is threaded into the upper end of the spindle 36 and which is contacted by the piston rod 58. When the spindle 36 is driven downwardly by the rod 58, the spindle 36 slides relative to the bushings 32 and 33 but the passageway 42 remains in fluid communication with the groove 35 throughout the stroke of the spindle 36. The spur gear 45 is carried by the spindle 36 during this downward stroke and remains in engagement with a rack 60 which extends between and is fixed to the sideplates 21 and 22.

OPERATION

Figure 6:
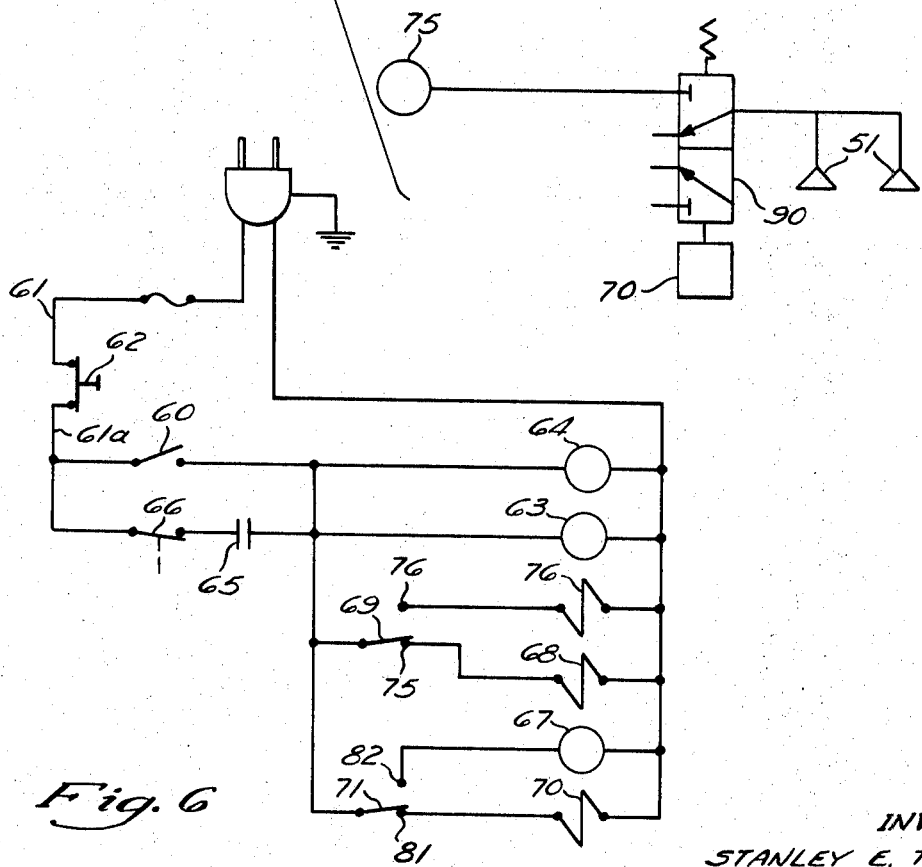
FIG. 6 is a schematic wiring diagram for electrical controls employed in the device.

The packages 10 and 10a are delivered from the packaging machine in double file, with a space between each such file. When a package 10a is conveyed by the conveyor 13 to a position beneath the cups 51, a limit switch 60 is tripped, which initiates the cycle of operation. As may be seen in FIG. 6, when the limit switch 60 is tripped by a package 10a, a lead 61 is connected to a lead 61a through an off-on switch 62 to thereby energize a timing relay 63 and a relay 64. When the relay 64 is energized, its contacts 65 are closed to complete a circuit to that relay and to the time delay relay 63 so that the circuit is maintained to the relays 63 and 64 through the now closed contact 65 and through a normally closed switch 66 of a time delay relay 67. Thus, when the limit switch 60 is opened by removal of a package 10a in a manner which will hereinafter be explained, the circuit is maintained through the relay 64 and its contacts 65 and normally closed switch 66 of time delay relay 67.

Figure 5:
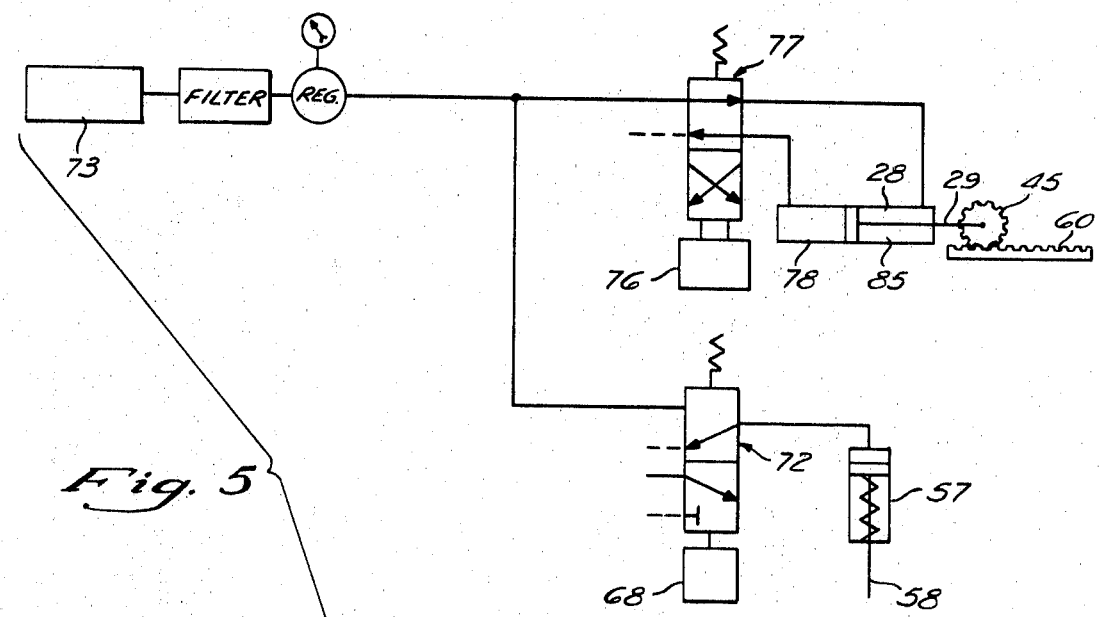
FIG. 5 is a schematic illustration of the fluid circuitry involved in the device.

When the limit switch 60 is closed, a solenoid 68 is energized through a normally closed switch 69 which is opened by timing out of the relay 63. Closure of the limit switch 60 also energizes a solenoid 70 through a normally closed limit switch 71. When the solenoid 68 is energized, a valve 72 (FIG. 5) is operated to connect the cylinder 57 to a fluid pressure source 73. When the cylinder 57 is connected to the fluid pressure source 73 in this manner, the piston rod 58 is driven downwardly and, therefore, the spindle 36, the gear 45, and the suction cups 51 are driven downwardly so that the cups 51 engage a package 10a. Since the solenoid 70 is also energized at this time, the vacuum cups 51 are connected to a vacuum source 75 by a valve 90.

The timing period of the time delay relay 63 corresponds to the time for the piston 58 to be driven downwardly so its suction cups 51 engage a package. After such engagement, the relay 63 times out to thereby transfer the switch 69 from a contact 75 to a contact 76. When the switch 69 leaves the contact 75, the solenoid 68 is deenergized to return the valve 72 to the position illustrated in FIG. 5. Thus, the cylinder 57 is exhausted and its spring drives the rod 58 upwardly. Since the spindle 36 is biased upwardly by its spring 37, the spindle 36 is likewise driven upwardly together with its attached vacuum cups 51. The package 10a has now been lifted from the conveyor belt 13, since the vacuum source 75 remains in communication with the cups 51.

Timing out of the relay 63 transfers the switch 69 to the contact 76 to thereby energize a solenoid 76. When the solenoid 76 is energized, a valve 77 connects a head chamber 78 of the double-acting cylinder 28 to the pressure source 73 to thereby drive the piston rod 29 to the left, as viewed in FIG 2. As the rod 29 is driven in this manner, the carriage 25, the spindle 36, and its attached spur gear 45 and suction cups 51 are all translated across the belt 13. During this translation, the gear 45 is in engagement with the rack 60 so that the spindle 36 and the suction cups 51 spin the package 10a on a central axis normal to the conveyor belt 13 during translation of the package across the belt.

When the package 10a is translated to a position above and between the packages 10, and has its flange 12 uniformly oriented with respect to the flanges 12 of the packages 10, a probe 80, which is fixed to and which extends from the carriage 25, strikes the limit switch 71 to transfer that switch from a contact 81 to a contact 82. As the switch 71 leaves the contact 81, the solenoid 70 is deenergized to shift the valve 90 back to the position illustrated in FIG 5. Thus, the suction is exhausted and the package 10a is dropped onto the belt 13. Transfer of the limit switch 71 to the contact 82 begins the timing cycle of the time delay relay 67 to open the switch 66 upon timing out. When the switch 66 is opened, the relay 64 is deenergized to open the switch 65, the switch 69 which is associated with the time delay relay 63 is returned to the contact 75, and the solenoid 76 is deenergized to return the valve 77 to the position illustrated in FIG 5. The valve 77 admits fluid pressure to a rod chamber 85 of the cylinder 28 and connects the head chamber 78 to exhaust so that the piston rod 29 retracts the carriage 25 to its illustrated position. The time delay relay 67 permits the carriage 25 to dwell so that the package 10a is dropped in a precise position relative to the adjacent packages 10. Moreover, this time delay before circuit interruption ensures that the limit switch 71 will not immediately return to the contact 81 before the vacuum in the cups 51 is completely vented to atmosphere.

The invention is not restricted to the slavish imitation of each and every detail set forth above. Obviously, procedures may be followed which change, eliminate, or add certain specific details.

I claim:

1. A method of transferring a succession of flat fragile packages over a supporting surface comprising the steps of moving each package in a predetermined direction and in a first path along said supporting surface, lifting each successive package away from the supporting surface, changing the orientation of each package by rotating each successive package about an axis normal to the surface, passing through said package, and fixed relative to said package, while simultaneously translating the package by moving said axis in a plane normal to said surface, releasing each successive package at the conclusion of the translation, and moving each released package in said predetermined direction but in a second path which is displaced relative to said first path.

2. A method for arranging in single file and uniform orientation on a moving surface a plurality of similar flat workpieces, such as packages, that are being carried by the surface in double file with the orientation of the workpieces in each file being uniform within the file but the orientation of the workpieces in one file being angularly removed from the orientation of the workpieces in the other file by a given angular distance, comprising the steps of translating a carriage between a pickup station at a point in one file and an unloading station at a point in the other file, said translating carriage having a down-up vacuum pickup head mounted thereon for oscillatory rotation through said angular distance, depressing the vacuum pickup head at the pickup station to engage the package, applying vacuum to the pickup head when said vacuum pickup head is momentarily depressed, rotating the pickup head during translation of the carriage, releasing the vacuum at the unloading station, and translating the carriage back to the pickup station.

3. A method for arranging in a single file and uniform orientation on a moving surface a plurality of similar flat workpieces, such as packages, that are being carried by the surface in double file with a space between the packages in each file and with the orientation of the workpieces in each file being uniform within the file but the orientation of the workpieces in one file being angularly removed from the orientation of the workpieces in the other file by a given angular distance, comprising the steps of lifting each successive package in one file away from the supporting surface, changing the orientation of each lifted package by rotating the package through said given angular distance about an axis normal to the surface, passing through said package, and fixed relative to said package, while simultaneously translating the package, and releasing each successive package at successive unloading stations which are located at the successive spaces between the packages in the other file.